(12) United States Patent
Branson et al.

(10) Patent No.: US 9,633,102 B2
(45) Date of Patent: *Apr. 25, 2017

(54) MANAGING PASSTHRU CONNECTIONS ON AN OPERATOR GRAPH

(71) Applicant: International Business Machines Corporation, Armonk, NY (US)

(72) Inventors: Michael J. Branson, Rochester, MN (US); Bradford L. Cobb, Katy, TX (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1 day.

This patent is subject to a terminal disclaimer.

(21) Appl. No.: 14/748,960

(22) Filed: Jun. 24, 2015

(65) Prior Publication Data
US 2015/0317364 A1    Nov. 5, 2015

Related U.S. Application Data

(63) Continuation of application No. 13/926,301, filed on Jun. 25, 2013, now Pat. No. 9,152,689.

(51) Int. Cl.
*G06F 17/30* (2006.01)
*H04L 12/26* (2006.01)
*G06F 13/10* (2006.01)

(52) U.S. Cl.
CPC ........ *G06F 17/30595* (2013.01); *G06F 13/10* (2013.01); *G06F 17/30516* (2013.01); *G06F 17/30958* (2013.01); *H04L 43/16* (2013.01)

(58) Field of Classification Search
USPC .................................................. 707/736
See application file for complete search history.

(56) References Cited

U.S. PATENT DOCUMENTS

| | | | |
|---|---|---|---|
| 6,233,541 B1 | 5/2001 | Butts et al. | |
| 7,613,848 B2 | 11/2009 | Amini et al. | |
| 7,644,110 B2 | 1/2010 | Nishizawa et al. | |
| 8,095,690 B2 | 1/2012 | Kashiyama et al. | |
| 8,239,828 B2 | 8/2012 | Liu et al. | |
| 8,560,526 B2 | 10/2013 | Santosuosso et al. | |
| 8,672,874 B2 | 3/2014 | Strickland et al. | |

(Continued)

OTHER PUBLICATIONS

Ballard et al., "IBM InfoSphere Streams: Harnessing Data in Motion", Sep. 2010, 360 pages, IBM Redbooks. http://www.redbooks.ibm.com/abstracts/sg247865.html.

*Primary Examiner* — Cam-Linh Nguyen
(74) *Attorney, Agent, or Firm* — Jospeh W. Cruz

(57) ABSTRACT

Embodiments of the disclosure provide a method, system, and computer program product for processing data such as a stream of tuples. Each tuple can contain one or more attributes. The method can include processing the attributes of the stream of tuples using stream operators operating on one or more computer processors and corresponding to one or more processing elements. The method can also include detecting an indicative element from a plurality of stream operators. The method can also include transmitting, in response to detecting the indicative element, a passthru command to a processing element corresponding to the indicative element. The method can also include altering, in response to receiving the passthru command at the processing element, a portion of attribute processing for the indicative element.

8 Claims, 8 Drawing Sheets

(56) References Cited

U.S. PATENT DOCUMENTS

| | | |
|---|---|---|
| 2001/0055124 A1 | 12/2001 | Varga |
| 2004/0210756 A1 | 10/2004 | Mowers et al. |
| 2009/0157786 A1 | 6/2009 | Porco et al. |
| 2011/0119270 A1 | 5/2011 | Jin et al. |
| 2012/0165728 A1 | 6/2012 | Strickland et al. |
| 2012/0215934 A1 | 8/2012 | Barsness et al. |
| 2012/0218268 A1 | 8/2012 | Accola et al. |
| 2013/0031335 A1 | 1/2013 | Santosuosso et al. |
| 2014/0379711 A1 | 12/2014 | Branson et al. |

MANAGING PASSTHRU CONNECTIONS ON AN OPERATOR GRAPH

FIELD

This disclosure generally relates to stream computing, and in particular, to computing applications that receive streaming data and process the data as it is received.

BACKGROUND

Database systems are typically configured to separate the process of storing data from accessing, manipulating, or using data stored in a database. More specifically, database systems use a model in which data is first stored and indexed in a memory before subsequent querying and analysis. In general, database systems may not be well suited for performing real-time processing and analyzing streaming data. In particular, database systems may be unable to store, index, and analyze large amounts of streaming data efficiently or in real time.

SUMMARY

Embodiments of the disclosure provide a method, system, and computer program product for processing data. The method, system, and computer program product receive two or more tuples to be processed by a plurality of processing elements operating on one or more computer processors.

One embodiment is directed toward a method for processing a stream of tuples. Each tuple can contain one or more attributes. The method can include processing the attributes of the stream of tuples using stream operators operating on one or more computer processors and corresponding to one or more processing elements. The method can also include detecting an indicative element from a plurality of stream operators. The method can also include transmitting, in response to detecting the indicative element, a passthru command to a processing element corresponding to the indicative element. The method can also include altering, in response to receiving the passthru command at the processing element, a portion of attribute processing for the indicative element.

Another embodiment is directed toward a computer program product for processing a stream of tuples. Each tuple can contain one or more attributes. The computer program product can comprise a computer readable storage medium having program code embodied therewith. The program code can comprise computer readable program code configured to process the attributes of the stream of tuples using stream operators operating on one or more computer processors and corresponding one or more processing elements. The program code can comprise computer readable program code configured to detect an indicative element from a plurality of stream operators. The program code can comprise computer readable program code configured to transmit, in response to detecting the indicative element, a passthru command to a processing element corresponding to the indicative element. The program code can comprise computer readable program code configured to alter, in response to receiving the passthru command at the processing element, a portion of attribute processing for the indicative element.

Another embodiment is directed toward a system for processing a stream of tuples. Each tuple can have one or more attributes. The system can include one or more processing elements operating on one or more computer processors configured to processes the attributes from the stream of tuples. The system can include a stream manager configured to alter a portion of the attribute processing for an indicative element in response to the processing element receiving a passthru command. The stream manager can further include a stream operator monitor configured to detect the indicative element from a plurality of stream operators in the one or more processing elements. The stream manager can further include a passthru manager configured to transmit the passthru command in response to detecting the indicative element.

BRIEF DESCRIPTION OF THE DRAWINGS

Like reference numbers and designations in the various drawings indicate like elements.

DETAILED DESCRIPTION

Figure 1:
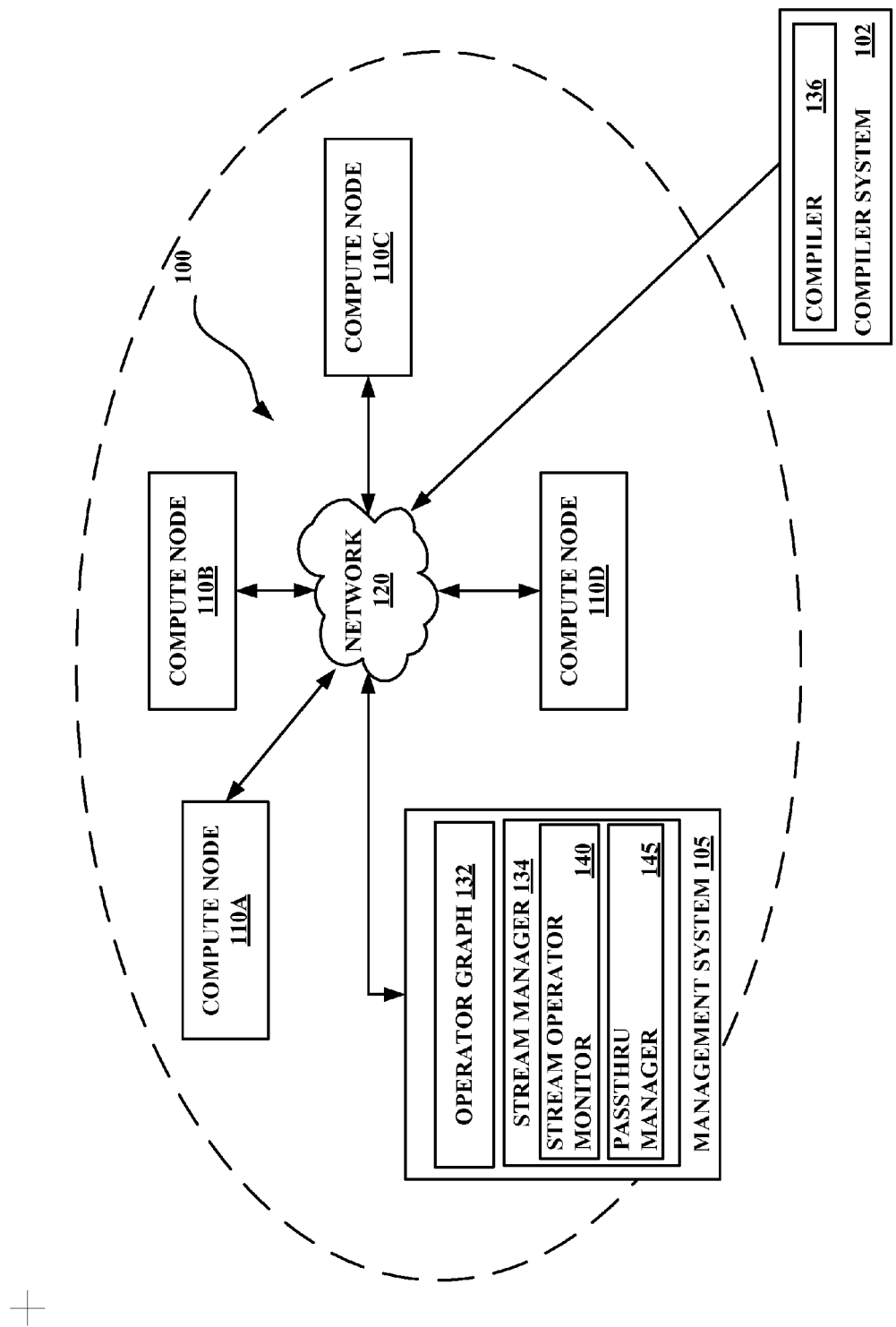
FIG. 1 illustrates a computing infrastructure configured to execute a stream computing application according to various embodiments.

Aspects of the present disclosure are generally directed toward a method of processing attributes. The attributes may be a part of a tuple from a stream of tuples. The stream of tuples may be processed using stream operators on an operator graph. An operator graph may be on one or more processing elements. The method may detect an indicative element from the stream operators. The method may include altering at least a portion of the processing of the indicative element to process the stream of tuples. Although not necessarily limited thereto, embodiments of the present disclosure can be appreciated in the context of streaming data and problems relating to indicative elements that process the stream of data. Throughout this disclosure, the term stream operator may be abbreviated "S.O."

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream computing application, stream operators are connected to one another such that data flows from one stream operator to the next (e.g., over a TCP/IP socket). When a stream operator receives data, it may perform operations, such as analysis logic, which may change the tuple by adding or subtracting attributes, or updating the values of existing attributes within the tuple. When the analysis logic is complete, a new tuple is then sent to the next stream operator. Scalability is achieved by distributing an application across nodes by creating executables (i.e., processing elements), as well as replicating processing elements on multiple nodes and load balancing among them. Stream operators in a stream computing application can be fused together to form a processing element that is executable. Doing so allows processing elements to share a common process space, resulting in much faster communication between stream operators than is available using inter-process communication techniques (e.g., using a TCP/IP socket). Further, processing elements can be inserted or removed dynamically from an operator graph representing the flow of data through the stream computing application. A particular stream operator may not reside within the same operating system process as other stream operators. In addition, stream operators in the same operator graph may be hosted on different nodes, e.g., on different compute nodes or on different cores of a compute node.

Data flows from one stream operator to another in the form of a "tuple." A tuple is a sequence of one or more attributes associated with an entity. Attributes may be any of a variety of different types, e.g., integer, float, Boolean, string, etc. The attributes may be ordered. In addition to attributes associated with an entity, a tuple may include metadata, i.e., data about the tuple. A tuple may be extended by adding one or more additional attributes or metadata to it. As used herein, "stream" or "data stream" refers to a sequence of tuples. Generally, a stream may be considered a pseudo-infinite sequence of tuples.

Nonetheless, an output tuple may be changed in some way by a stream operator or processing element. An attribute or metadata may be added, deleted, or modified. For example, a tuple will often have two or more attributes. A stream operator or processing element may receive the tuple having multiple attributes and output a tuple corresponding with the input tuple. The stream operator or processing element may only change one of the attributes so that all of the attributes of the output tuple except one are the same as the attributes of the input tuple.

Generally, a particular tuple output by a stream operator or processing element may not be considered to be the same tuple as a corresponding input tuple even if the input tuple is not changed by the processing element. However, to simplify the present description and the claims, an output tuple that has the same data attributes or is associated with the same entity as a corresponding input tuple will be referred to herein as the same tuple unless the context or an express statement indicates otherwise.

Stream computing applications handle massive volumes of data that need to be processed efficiently and in real time. For example, a stream computing application may continuously ingest and analyze hundreds of thousands of messages per second and up to petabytes of data per day. Accordingly, each stream operator in a stream computing application may be required to process a received tuple within fractions of a second. Unless the stream operators are located in the same processing element, it is necessary to use an inter-process communication path each time a tuple is sent from one stream operator to another. Inter-process communication paths can be a critical resource in a stream computing application. According to various embodiments, the available bandwidth on one or more inter-process communication paths may be conserved. Efficient use of inter-process communication bandwidth can speed up processing.

FIG. 1 illustrates one exemplary computing infrastructure 100 that may be configured to execute a stream computing application, according to some embodiments. The computing infrastructure 100 includes a management system 105 and two or more compute nodes 110A-110D—i.e., hosts—which are communicatively coupled to each other using one or more communications networks 120. The communications network 120 may include one or more servers, networks, or databases, and may use a particular communication protocol to transfer data between the compute nodes 110A-110D. A compiler system 102 may be communicatively coupled with the management system 105 and the compute nodes 110 either directly or via the communications network 120.

Figure 3:
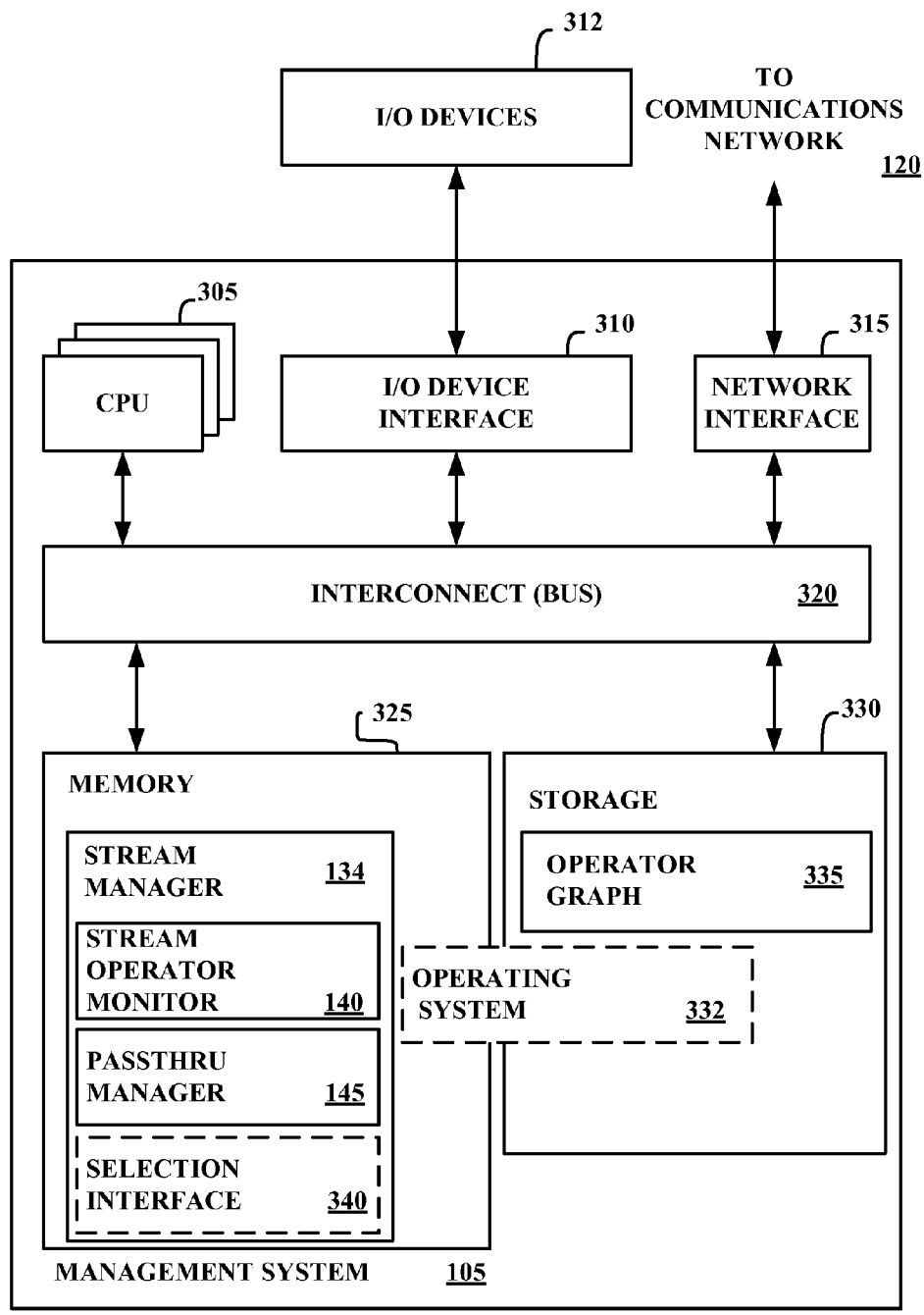
FIG. 3 illustrates a more detailed view of the management system of FIG. 1 according to various embodiments.

The management system 105 can control the management of the compute nodes 110A-110D (discussed further on FIG. 3). The management system 105 can have an operator graph 132 with one or more stream operators and a stream manager 134 to control the management of the stream of tuples in the operator graph 132. The stream manager 134 can have components such as a stream operator monitor 140 and a passthru manager 145. The stream operator monitor 140 can detect an indicative element (discussed below) and communicate the indicative element to the stream manager 134, according to various embodiments. The passthru manager 145 can manage the implementation of a passthru feature for the indicative element.

The stream operators in the operator graph 132 can have an indicative element. An indicative element can be a stream operator that does not transmit a processed attribute (explained below). The lack of receipt of a tuple with a processed attribute can indicate that the element, e.g., a stream operator or a processing element, has a fault. In order to identify an indicative element and enable a passthru feature, components of a stream manager 134 can be used. For example, a stream operator monitor 140 can identify an indicative element, a selection interface 340 (in FIG. 3) can allow a user to enable the passthru feature, and the passthru manager 145 can control when an indicative element has the passthru feature activated.

The communications network 120 may include a variety of types of physical communication channels or "links." The links may be wired, wireless, optical, or any other suitable media. In addition, the communications network 120 may include a variety of network hardware and software for performing routing, switching, and other functions, such as routers, switches, or bridges. The communications network 120 may be dedicated for use by a stream computing application or shared with other applications and users. The communications network 120 may be any size. For example, the communications network 120 may include a single local area network or a wide area network spanning a large geographical area, such as the Internet. The links may provide different levels of bandwidth or capacity to transfer data at a particular rate. The bandwidth that a particular link provides may vary depending on a variety of factors, including the type of communication media and whether particular network hardware or software is functioning correctly or at full capacity. In addition, the bandwidth that a particular link provides to a stream computing application may vary if the link is shared with other applications and users. The available bandwidth may vary depending on the load placed on the link by the other applications and users. The bandwidth that a particular link provides may also vary depending on a temporal factor, such as time of day, day of week, day of month, or season.

Figure 2:
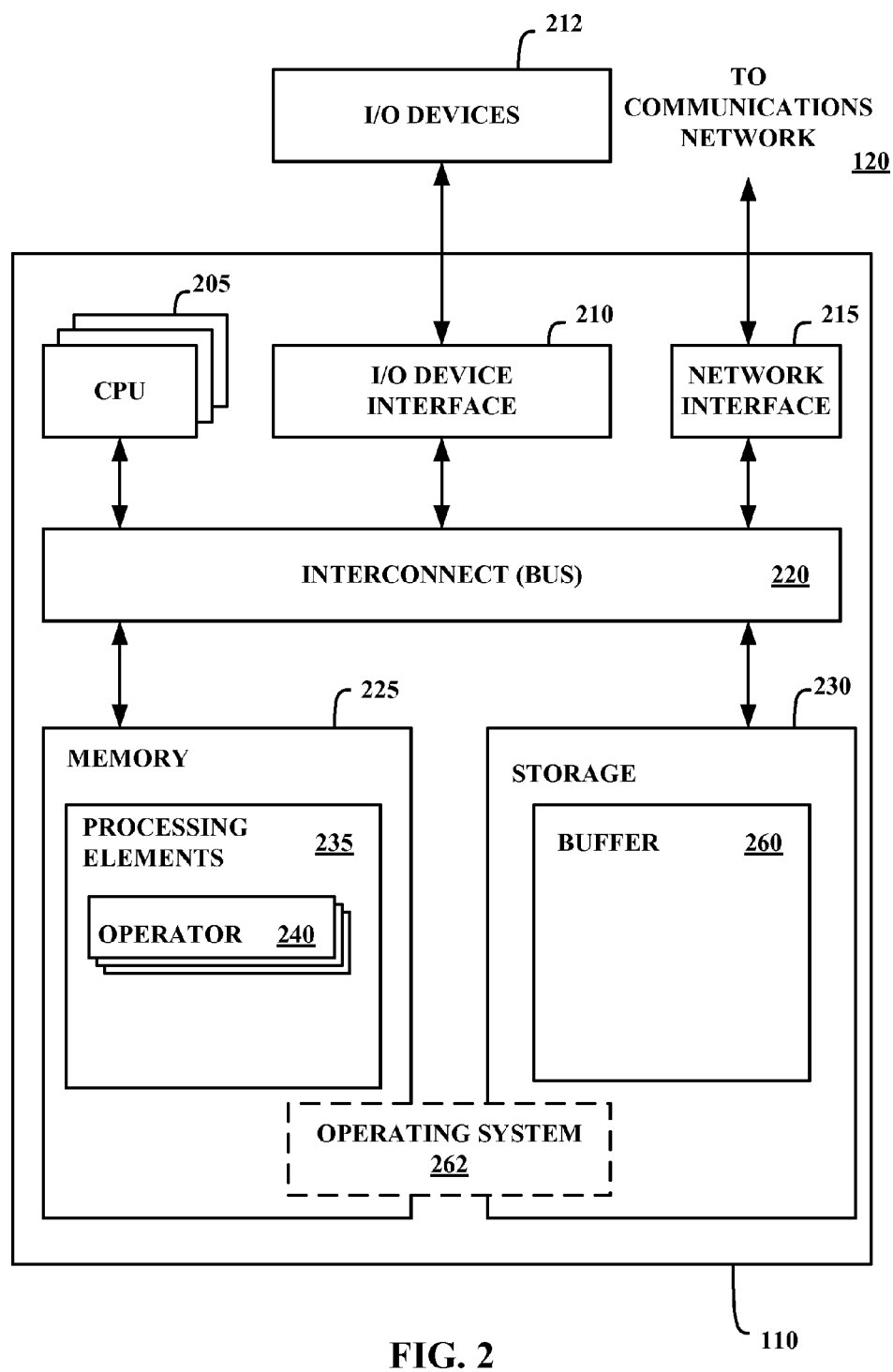
FIG. 2 illustrates a more detailed view of a compute node of FIG. 1 according to various embodiments.

FIG. 2 is a more detailed view of a compute node 110, which may be the same as one of the compute nodes 110A-110D of FIG. 1, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In one embodiment, a processor 205 may be a digital signal processor (DSP). One or more processing elements 235 (described below) may be stored in the memory 225. A processing element 235 may include one or more stream operators 240 (described below). In one embodiment, a processing element 235 is assigned to be executed by only one CPU 205, although in other embodiments the stream operators 240 of a processing element 235 may include one or more threads that are executed on two or more CPUs 205. The memory 225 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120.

A stream computing application may include one or more stream operators 240 that may be compiled into a "processing element" container 235. The memory 225 may include two or more processing elements 235, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The storage 230 may include a buffer 260. Although shown as being in storage, the buffer 260 may be located in the memory 225 of the compute node 110 or in a combination of both memories. Moreover, storage 230 may include storage space that is external to the compute node 110, such as in a cloud.

The compute node 110 may include one or more operating systems 262. An operating system 262 may be stored partially in memory 225 and partially in storage 230. Alternatively, an operating system may be stored entirely in memory 225 or entirely in storage 230. The operating system provides an interface between various hardware resources, including the CPU 205, and processing elements and other components of the stream computing application. In addition, an operating system provides common services for application programs, such as providing a time function.

FIG. 3 is a more detailed view of the management system 105 of FIG. 1 according to some embodiments. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 315, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a random access memory, e.g., SRAM, DRAM, or Flash. The storage 330 is generally included to be representative of a non-volatile memory, such as a hard disk drive, solid state device (SSD), removable memory cards, optical storage, Flash memory devices, network attached storage (NAS), connections to storage area-network (SAN) devices, or the cloud. The network interface 315 is configured to transmit data via the communications network 120.

The memory 325 may store a stream manager 134. The stream manager 134 can have software features that manage the passthru feature of the stream operator 240. In various embodiments, the stream manager 134 may have a stream operator monitor 140, a passthru manager 145, and a selection interface 340.

The stream operator monitor 140 can monitor one or more stream operators 240 for an indicative element. The indicative element can be a stream operator 240 that fails to transmit a tuple with a processed attribute. In one example, a severed connection may cause the stream operator 240 to stop transmitting the tuple and become an indicative element. For example, the connection between a plurality of stream operators 240, where a first stream operator transmits to a second stream operator, can be severed or faulty if the second stream operator does not received a tuple with a processed attribute from the first stream operator.

The lack of receipt of the tuple can be for a variety of reasons. For example, the first stream operator can have an operation that depends on searching a database. If the connection between the database and the first stream operator is severed, then the first stream operator cannot output a tuple with a processed attribute to the second stream operator.

The first stream operator can also be indicative of a fault if the first stream operator did not start properly, and did not make a connection with the second stream operator. In another example, a connection between the first stream operator and second stream operator could be faulty because of a network problem, a transport or messaging protocol problem, or some incompatibility between the two operators. This may occur even if the first stream operator and second stream operator are functional. The lack of a connection can be indicative of a fault on the first stream operator, i.e., make the first stream operator an indicative element.

In another example, an indicative element can exist if the stream operator has a non-performing subroutine that causes the stream operator not to transmit a tuple with a processed attribute. In various embodiments, the stream operator monitor 140 can determine if there is a connection by receiving a signal from the stream operator that indicates that the stream operator is transmitting a tuple with a processed attribute.

The indicative element is not limited to stream operators. In various embodiments, the indicative element can include a processing element and be referred to as an indicative processing element. For example, a problem or failure in a stream operator contained in a processing element can cause the whole processing element to fail. A processing element can contain a single stream operator or multiple stream operators which can cause a series of missing connections between stream operators.

In certain embodiments, the passthru manager 145 can activate the passthru feature by transmitting a passthru command to an element, e.g., a processing element or stream operator, adjacent to the indicative element, i.e., the adjacent element. The adjacent element can be the element immediately downstream or upstream from the element. The adjacent element, e.g., a stream operator or processing element, to the indicative element can receive the passthru command and activate the passthru feature. The passthru feature can allow the adjacent element to disable or alter processing of an attribute of a tuple and transmit the tuple with either a semi-processed or unprocessed attribute to another element, skipping the indicative element. Throughout the disclosure, the term element can be used to refer to either a stream operator or processing element. The term stream operator can be used interchangeably with the term element.

The selection interface 340 can be an interface for a user to select between different passthru methods. In various embodiments, the user may graphically select particular stream operators to enable the passthru feature. The selection interface 340 may communicate the selection of the user to the stream manager 134. In various embodiments, the selection interface 340 can be an optional feature.

Additionally, the storage 330 may store an operator graph 335. The operator graph 335 may define how tuples are routed to processing elements 235 (FIG. 2) for processing.

The management system 105 may include one or more operating systems 332. An operating system 332 may be stored partially in memory 325 and partially in storage 330. Alternatively, an operating system may be stored entirely in memory 325 or entirely in storage 330. The operating system provides an interface between various hardware resources, including the CPU 305, and processing elements and other components of the stream computing application. In addition, an operating system provides common services for application programs, such as providing a time function.

Figure 4:
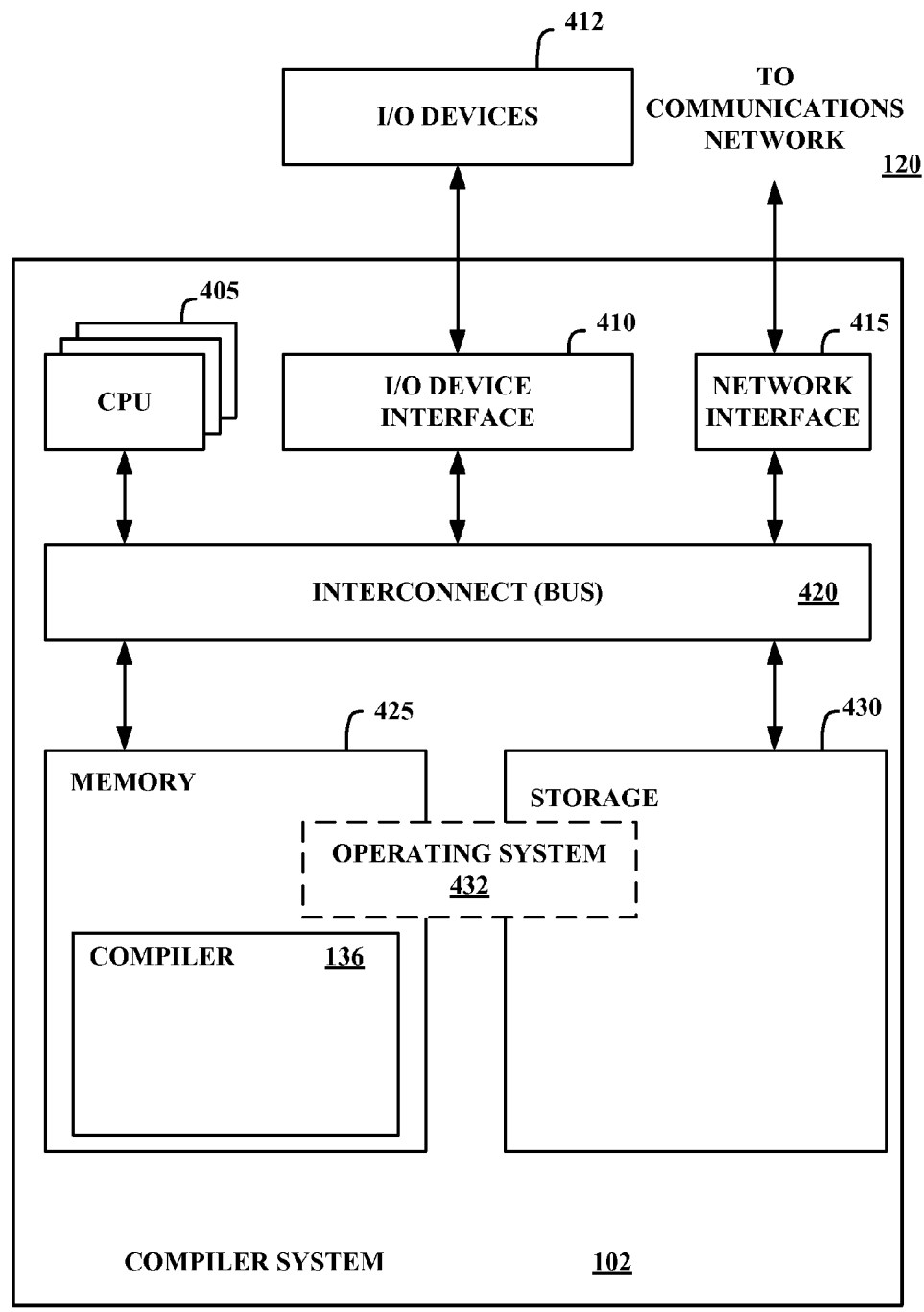
FIG. 4 illustrates a more detailed view of the compiler system of FIG. 1 according to various embodiments.

FIG. 4 is a more detailed view of the compiler system 102 of FIG. 1 according to some embodiments. The compiler system 102 may include, without limitation, one or more processors (CPUs) 405, a network interface 415, an interconnect 420, a memory 425, and storage 430. The compiler system 102 may also include an I/O device interface 410 connecting I/O devices 412, e.g., keyboard, display, and mouse devices, to the compiler system 102.

Each CPU 405 retrieves and executes programming instructions stored in the memory 425 or storage 430. Similarly, each CPU 405 stores and retrieves application data residing in the memory 425 or storage 430. The interconnect 420 is used to move data, such as programming instructions and application data, between the CPU 405, I/O device interface 410, storage unit 430, network interface 415, and memory 425. The interconnect 420 may be one or more busses. The CPUs 405 may be a single CPU, multiple CPUs, or a single CPU having multiple processing cores in various embodiments. In one embodiment, a processor 405 may be a DSP. Memory 425 is generally included to be representative of a random access memory, e.g., SRAM, DRAM, or Flash. The storage 430 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. The network interface 415 is configured to transmit data via the communications network 120.

The compiler system 102 may include one or more operating systems 432. An operating system 432 may be stored partially in memory 425 and partially in storage 430. Alternatively, an operating system may be stored entirely in memory 425 or entirely in storage 430. The operating system provides an interface between various hardware resources, including the CPU 405, and processing elements and other components of the stream computing application. In addition, an operating system provides common services for application programs, such as providing a time function.

The memory 425 may store a compiler 136. The compiler 136 compiles modules, which include source code or statements, into the object code, which includes machine instructions that execute on a processor. In one embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the stream computing application. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both. The output of the compiler 136 may be represented by an operator graph, e.g., the operator graph 335.

In various embodiments, the compiler 136 can include the passthru feature on a particular stream operator on the operator graph 335 during compile time by writing the passthru feature onto a particular stream operator. In various embodiments, the passthru feature may be included as a default and activated by a passthru command from the stream manager 134. The passthru feature may also be included as an optional feature for a particular stream operator and may be activated by the user.

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple compute nodes with the benefit of faster inter-operator communications. The compiler 136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Figure 5:
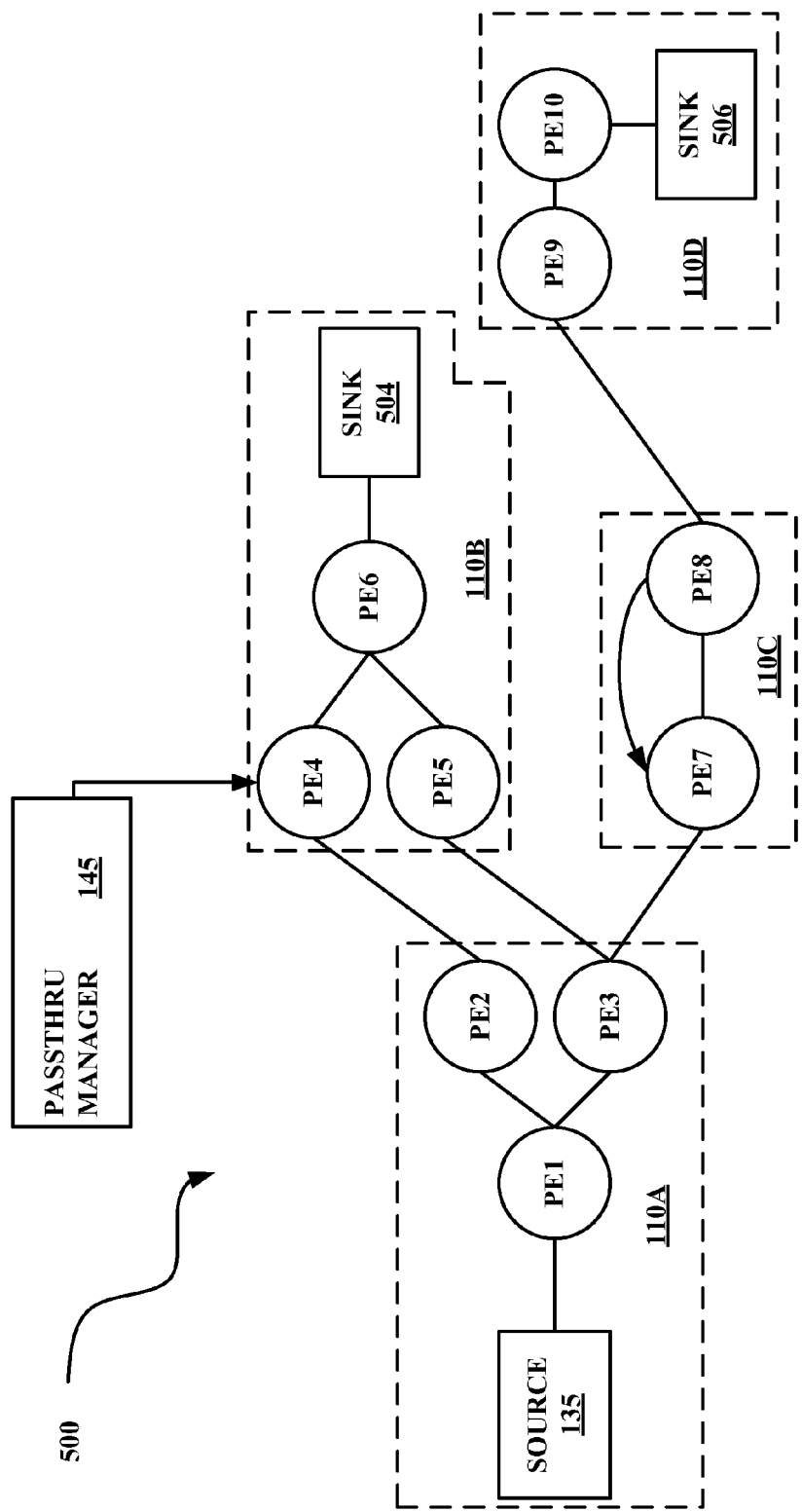
FIG. 5 illustrates an operator graph for a stream computing application according to various embodiments.

FIG. 5 illustrates an exemplary operator graph 500 for a stream computing application beginning from one or more sources 135 through to one or more sinks 504, 506, according to some embodiments. This flow from source to sink may also be generally referred to herein as an execution path. In addition, a flow from one processing element to another may be referred to as an execution path in various contexts. Although FIG. 5 is abstracted to show connected processing elements PE1-PE10, the operator graph 500 may include data flows between stream operators 240 (FIG. 2) within the same or different processing elements. Typically, processing elements, such as processing element 235 (FIG. 2), receive tuples from the stream as well as output tuples into the stream (except for a sink—where the stream terminates, or a source—where the stream begins). While the operator graph 500 includes a relatively small number of components, an operator graph may be much more complex and may include many individual operator graphs that may be statically or dynamically linked together.

The example operator graph shown in FIG. 5 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. Inter-process communication paths used for inter-process communications can be a critical resource in a stream computing application. However, when stream operators are fused together, the fused stream operators can use more rapid communication techniques for passing tuples among stream operators in each processing element.

Each processing element may have a passthru manager 145. The passthru manager 145 may transmit the passthru command to a processing element. The processing element may further transmit or direct the passthru command to a targeted stream operator within the processing element. Once the targeted stream operator receives the passthru command, then the targeted stream operator may activate the passthru feature. The operator graph 132 can encompass one or more processing elements, e.g., PE2 and PE4 from FIG. 5, which may lie on more than one compute node, e.g., 110A and 110B. In various embodiments, the passthru manager 145 can transmit the passthru command to an adjacent processing element if an indicative processing element is detected. The indicative processing element can be a processing element that indicates a fault. The adjacent processing element can be the processing element downstream or upstream from the indicative processing element and can receive the passthru command and passthru the indicative processing element.

The operator graph 500 begins at a source 135 and ends at a sink 504, 506. Compute node 110A includes the processing elements PE1, PE2, and PE3. Source 135 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Tuples that flow to PE2 are processed by the stream operators contained in PE2, and the resulting tuples are then output to PE4 on compute node 110B. Likewise, the tuples output by PE4 flow to operator sink PE6 504. Similarly, tuples flowing from PE3 to PE5 also reach the operators in sink PE6 504. Thus, in addition to being a sink for this example operator graph, PE6 could be configured to perform a join operation, combining tuples received from PE4 and PE5. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in a sink processing element, for example PE10 506.

Processing elements 235 (FIG. 2) may be configured to receive or output tuples in various formats, e.g., the processing elements or stream operators could exchange data marked up as XML documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIG. 1 may be configured to monitor a stream computing application running on compute nodes, e.g., compute nodes 110A-110D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D.

Because a processing element may be a collection of fused stream operators, it is equally correct to describe the operator graph as one or more execution paths between specific stream operators, which may include execution paths to different stream operators within the same processing element. FIG. 5 illustrates execution paths between processing elements for the sake of clarity.

Figure 6:
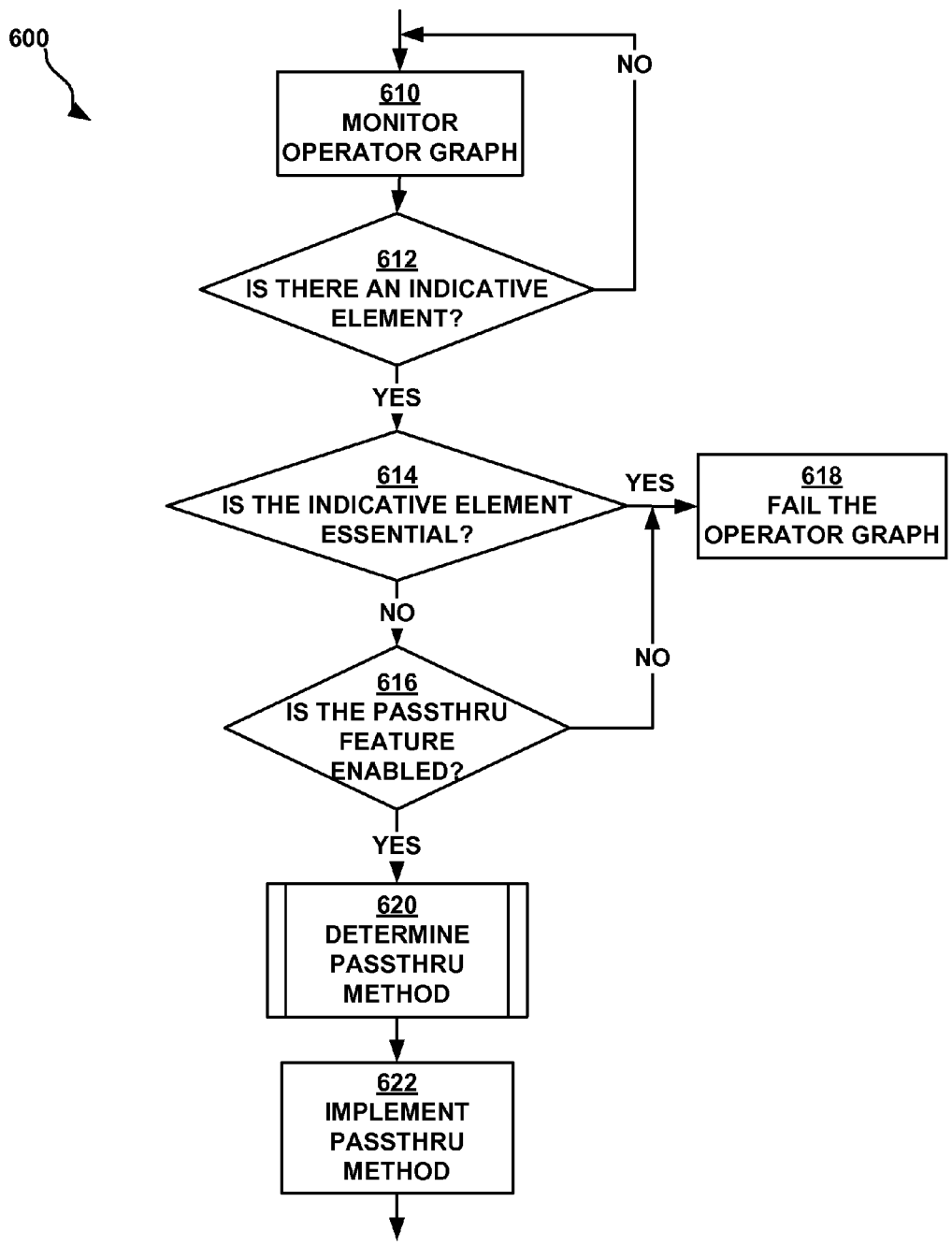
FIG. 6 illustrates a flowchart of a method of processing a stream of tuples using the passthru feature, according to various embodiments.

FIG. 6 illustrates a flowchart of a method 600 of processing a stream of tuples using the passthru feature, according to various embodiments. The method 600 can begin at operation 610 where the stream operator monitor 140 monitors the operator graph 132 to determine whether a stream operator is an indicative element. As mentioned previously, an indicative element can be a stream operator that is not transmitting a processed attribute.

The stream operator monitor 140 can determine that a stream operator is faulty if a particular stream operator does not transmit a functional signal. The functional signal can be a signal that a stream operator transmits to the stream operator monitor 140 when it receives a tuple with a processed attribute from the prior stream operator. For example, if a first stream operator transmits a tuple with a processed attribute to a second stream operator, then the second stream operator can transmit the functional signal. If there are eight stream operators on the operator graph 132, then the stream operator monitor 140 should receive eight functional signals. If the stream operator monitor 140 receives five functional signals, then some stream operators can be faulty.

The functional signal can depend on other factors besides the receipt of a processed attribute. For example, the functional signal can depend on whether a stream operator is able to receive and transmit a tuple with a processed attribute. In various embodiments, the operator graph 132 can halt processing of tuples in response to an absence of a functional signal.

An indicative element can be detected without monitoring for a functional signal. In various embodiments, a stream operator monitor 140 can monitor for an indicative element by requiring each stream operator in an operator graph to keep track of its own status, For example, the status of a stream operator can be determined by: a comparison between the number of active connections in the stream operator versus the number of assigned connections; whether the stream operator able to perform processing, e.g., if the stream operator has a function where it looks up a record from a database, is the lookup function working; a comparison of the number of tuples the stream operator sends versus the number of tuples the stream operator receives. The stream operator monitor 140 can receive the status from each stream operator in the operator graph. If any stream operator has a negative status, then the stream operator monitor 140 can identify the stream operators with a negative status as an indicative element.

In various embodiments, the stream operator monitor 140 can monitor downstream operations. For example, the stream operator monitor 140 can analyze each attribute of the tuple to determine if the stream operator processed the attribute.

After the stream operator monitor 140 monitors the operator graph 132 for the indicative element, then the method 600 can proceed to operation 612. In operation 612, the stream operator monitor 140 can determine if a particular stream operator is faulty. As explained in the example above, the absence of a functional signal can indicate an indicative element.

An absence of a functional signal can be due to an internal error in the stream operator. An example of the first stream operator not able to transmit a processed attribute to the second stream operator can occur when the first stream operator has a routine that compares the attribute with an external database. If the external database is not functioning or the connection to the external database is non-functional, then the first stream operator is not able to transmit a processed attribute and the first stream operator is indicative of a fault, i.e., an indicative element.

In another example, the functional signal can be withheld if the stream operator is not receiving a stream of tuples due to a connection issue. For example, if a first stream operator is not transmitting a tuple to a second stream operator, either the first stream operator or the second stream operator can be considered faulty.

If the stream operator is not faulty, then the method 600 can proceed to operation 610 where the stream operator monitor 140 monitors the operator graph for an indicative element. If the stream operator is faulty, then the method 600 can continue to operation 614. In operation 614, the stream manager 134 determines whether the indicative element is essential. Generally, an indicative element is essential when a downstream process on the operator graph 132 depends on the processed attribute from the element. For example, if a first stream operator transcribes text from an image attribute, and a second stream operator takes an attribute containing the transcribed text and compares the text against a database, then the first stream operator can be considered an essential indicative element. In the above example, the second stream operator may not be an essential stream operator if there are no other stream operators in the operator graph 132 that depend on it.

A stream operator may be considered essential based on user parameters. Using the mentioned example, if the user indicates that the compare against the database step may be skipped, then the first stream operator can be considered non-essential. Assuming that the stream manager 134 encounters an essential indicative element, then the stream manager 134 can deactivate the operator graph 132 so that the operator graph 132 stops the processing of tuples in operation 618. Operation 618 can cause the operator graph 132 to stop receiving the tuples which can send an indication to the user or the system 100 that the operator graph 132 is no longer functional. In various embodiments, the user can override the failure and cause the operator graph 132 to continue processing tuples.

If the stream operator is found to be non-essential, then the operation 614 can proceed to operation 616. In operation 616, the stream manager 134 can determine whether the passthru feature on the operator graph 132 is enabled. In some circumstances, the user can make a determination to disable the passthru feature. For example, if the user requires every attribute to be processed, then the user can disable the passthru feature. The above example can be particularly important in applications where it is important to process all attributes such as in criminal records processing, or in tax analysis. In various embodiments, the passthru feature can be activated by default. If the passthru feature is not enabled, then the method 600 may proceed to operation 618 where the operator graph 132 fails.

If the passthru feature is enabled, then the method 600 can proceed to operation 620. In operation 620, the passthru method is presented to the user via a selection interface 340 to select from a list of possible passthru methods and is further discussed below. A sample of possible passthru methods is provided on FIG. 7. The passthru methods include where the stream operator writes a reference attribute 718, where the stream operator passes tuple through without processing 720, and where a dummy stream operator is formed to process tuples 722. Each of these passthru methods are described further below.

The stream manager 134 determines the passthru method to implement in operation 620. After operation 620, the method 600 can proceed to operation 622. In operation 622, the selected passthru method is implemented. In various embodiments, the passthru manager 145 can be responsible for generating a passthru command that corresponds to the selected passthru method obtained from operation 620. The passthru command can be a sequence of instructions that is generated by the passthru manager 145. The passthru command can be further received by the adjacent element to the indicative element to initiate a passthru method.

In some embodiments, the passthru command can be generated by the passthru manager 145 and received by the stream manager 134 as an intermediary. For example, in particular passthru methods, e.g., create a dummy stream operator, other components of the system 100 can be required to implement the passthru command. The stream manager 134 can receive the passthru command corresponding to creating a dummy stream operator and the stream manager 134 can accesses the compiler 136 where the compiler 136 creates the dummy stream operator. In various embodiments, the stream manager 134 may create the dummy stream operator in runtime.

Figure 7:
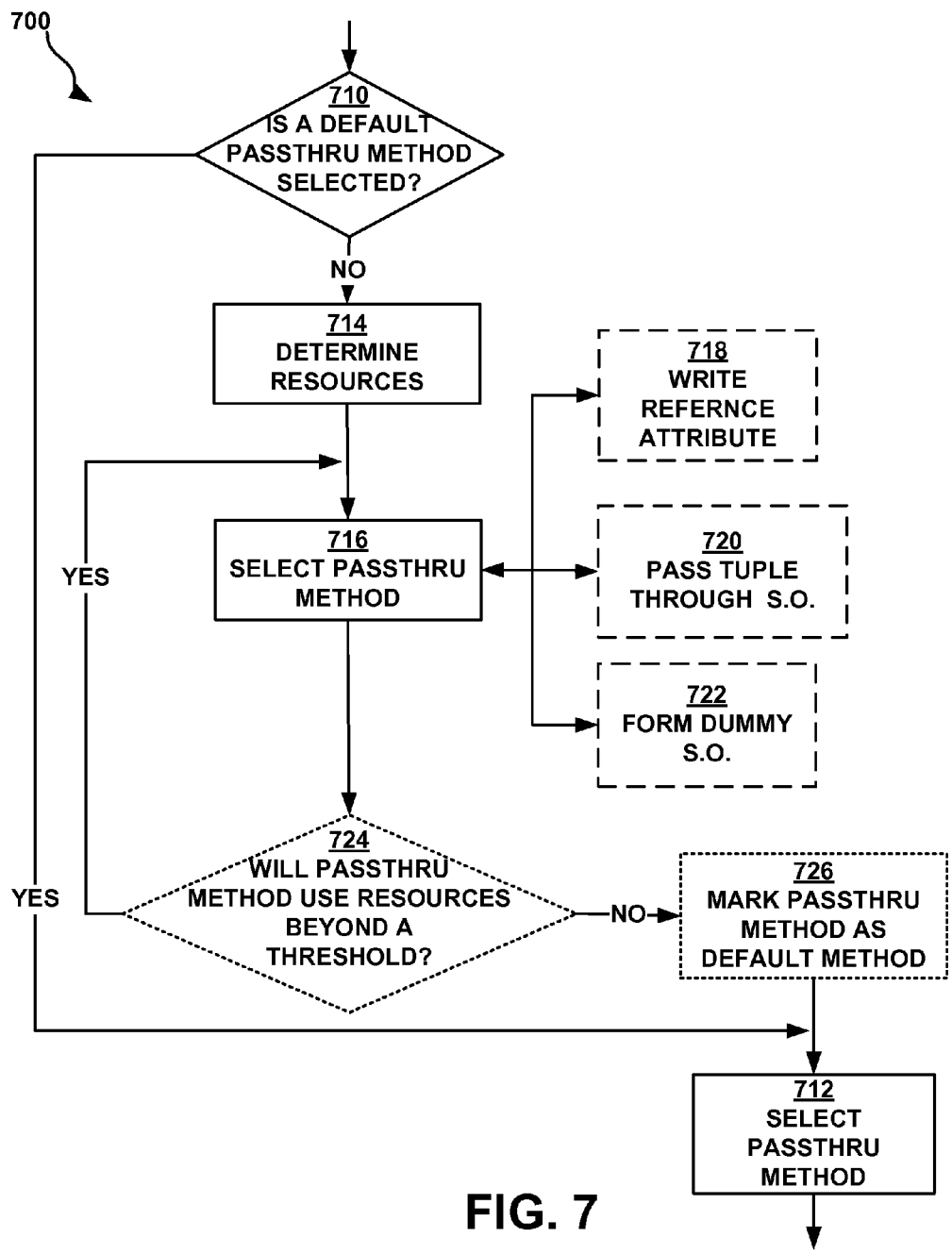
FIG. 7 illustrates a flowchart of a method of selecting a passthru method, according to various embodiments.

FIG. 7 illustrates a flowchart of a method 700 of selecting a passthru method, according to various embodiments. The method 700 can correspond to operation 620 of FIG. 6. The method 700 can begin at operation 710, where the stream manager 134 determines a presence of a default passthru method and whether to select the default passthru method. In various embodiments, a default passthru method may be selected by the user as a default setting for the passthru feature. For example, the user can dictate that, when the passthru feature is activated, a dummy stream operator should be formed. The default selection may occur without any further user input. If there is a default passthru method, then the operation proceeds to operation 712. In operation 712, the stream manager 134 can select the passthru method and proceed to operation 622.

If there is not a default passthru method, then the method 700 can proceed to operation 714. In operation 714, the stream manager 134 may determine the resources of the computing system 100 for the given operator graph 132. The resources can be in the form of a performance factor, which can represent a numerical score of performance. For example, the performance factor may weigh different aspects of the operator graph 132 such as processing time, bandwidth, network bandwidth between compute nodes, or memory usage. Each of the factors can have the weights customized by the users. In various embodiments, the resources of the computing system 100 underlying the operator graph 132 can measure the performance factor without regard to a numerical score.

The resources can be further used to determine a threshold. For example, if the slowest passthru method has a processing time of 10 ms, then the threshold may be a processing time of 10 ms. The threshold can also be user customizable to reflect certain goals. For example, the user can specify that the processing time be under 2 ms to include only the fastest passthru method.

After the resources of the computing system 100 are determined, then the method 700 can proceed to operation 716. In operation 716, the passthru method is selected. In various embodiments, the passthru method can be selected by the stream manager 134 based on the predicted performance of a passthru method. The performance can be predicted using criteria such as past performance or a performance history. In various embodiments, the passthru method is selected by the user via a selection interface 340. The section interface 340 may be a graphical user interface where the user can select from one or more passthru methods. For example, the user may be prompted with the choice of one or more passthru methods. The passthru methods can include where the stream operator writes a reference attribute 718, where the stream operator passes tuples through without processing 720, and where a dummy stream operator is formed to process tuples 722. Each of the described passthru methods may be described in FIG. 8.

Figure 8:
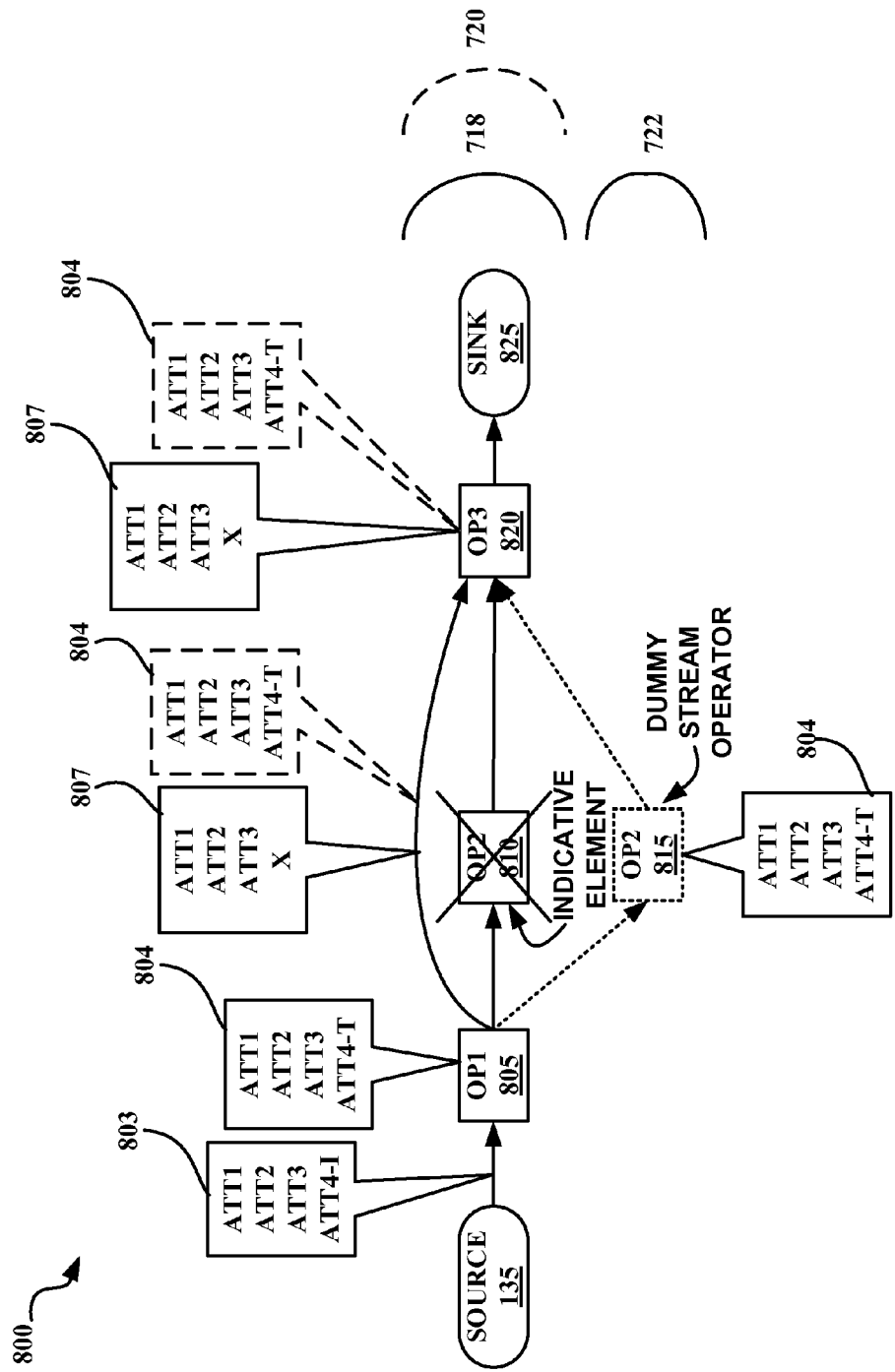
FIG. 8 illustrates an exemplary operator graph that uses one or more passthru features, according to various embodiments.

FIG. 8 illustrates an operator graph 800 that uses one or more passthru features, according to various embodiments. The operator graph 800 can be an example of the operator graph 132 from FIG. 1. The operator graph 800 receives a stream of tuples from a source 135. Stream operator 805 can receive a tuple 803 with four attributes in the three illustrated passthru methods. Stream operator 805 can process one or more of the attributes. For example, if the operator graph represents the activity of a tollbooth and attribute 4 (described as ATT4-I) represents an image capture of a license plate, then stream operator 805 can undertake the transcription of a license plate image. The stream operator 805 can transmit the tuple 804 with the transcribed image of the license plate (described as ATT4-T).

Continuing with the tollbooth example, the stream operator 810 can have the function of receiving the tuple 804 with the transcribed license plate ATT4-T from stream operator 805 and comparing it to a database of stolen cars. If the communication with the database is not working, then stream operator 810 can be considered an indicative element.

The operation of passthru method 718 can occur when the stream operator 810 writes a reference attribute. The stream operator 810 can generate a reference attribute that indicates that the database search was not conducted. In the illustration, the letter X is used to show a generated attribute that provides such an indication. In various embodiments, the stream operator 810 can use the reference attribute X to refer back to the omitted attribute. For example, in the tollbooth example, the stream operator 810 can transmit the reference attribute X through the operator graph 800. The reference attribute X, when used by a stream operator, e.g., stream operator 820, can point back to the location of the transcribed license plates (such as a table of transcribed license plates).

In various embodiments, the reference attribute X can be a transcribed license plate along with an indication that the transcribed license plate was not compared to the database. A stream operator, e.g., stream operator 820, which reads that the indication can know that the transcribed license plate was not compared to the database. After the reference attribute X is substituted in stream operator 810, then the tuple 807 can continue to stream operator 820. Stream operator 820 can process one or more attributes from the tuple 807. In various embodiments, the stream operator 820 can process the reference attribute X. After the tuple 807 goes to stream operator 820, the tuple 807 can be transmitted to a sink 825.

The operation of passthru method 720 can occur when the indicative element 810 transmits a tuple 804 without processing the attribute. The stream operator 810 can receive the tuple 804, and upon finding out that the license plate cannot be compared to the database, transmit the tuple 804 with attribute ATT4-T to stream operator 820. In various embodiments, the attribute ATT4-T does not have an indication that it has been processed. For example, if a true or false results from stream operator 810 to indicate that the car is stolen or not stolen, then a downstream operator, e.g., stream operator 820, can receive the transcribed license plate ATT4-T instead of the true or false result. Stream operator 820 can process one or more attributes from the tuple 804 and transmit the tuple 804 to the sink 825.

The operation of passthru method 722 can occur when the stream manager 134 or the compiler 136 creates a dummy stream operator 815. Once the indicative element 810 is detected, then the stream manager 134 may create a dummy stream operator 815 to process the tuple. The dummy stream operator 815 can reroute the stream of tuples which can reduce the processing delay from the passthru. The dummy stream operator 815 can receive the tuple 804 and be configured to specifically transmit the tuple 804 to the stream operator 820 in a similar manner to passthru method 720.

The methods 718, 720, and 722 can be initiated using the passthru command. The passthru command can be received by an adjacent element. In the operator graph 800, the adjacent elements are stream operator 805 and stream operator 820. In various embodiments, the passthru command can be received by stream operator 805 which can initiate a passthru method. For example, if the stream operator 805 receives the passthru command corresponding to method 718, then the stream operator 805 can passthru the tuple 807 with attribute X to stream operator 820. The passthru command can also be received by stream operator 820 that can request from stream operator 805 or the stream manager 134 to receive the tuple 807 directly from stream operator 805. In various embodiments, an operator graph can require that both adjacent elements receive the passthru command.

Even though the operator graph 800 depicts the stream operator 810 as transmitting to one stream operator, e.g., stream operator 820, the stream operator 810 can transmit and be received by more than one stream operator. In this example, the stream operator 805 can passthru a tuple to the receiving stream operators.

Returning to FIG. 7, once the user or the stream manager 134 selects a passthru method in operation 716, then the method 700 can proceed to operation 724. Operation 724 can be considered an optional step. In various embodiments, the result in operation 716 may override the result of operation 724. For example, the selected passthru method from a user may have a higher weight than the selected passthru method from the stream manager 134.

In operation 724, the stream manager 134 can measure the resources required to use particular passthru method, i.e., the performance of the passthru method. In various embodiments, a simulation may be used to predict the performance of using a passthru method. This may be accomplished, for example, by using a simulation engine. A simulation engine can simulate the effect of various scenarios regarding passthru method usage. In various embodiments, the simulation engine may simulate the performance of multiple passthru methods as one step and compare each passthru method to the threshold.

The performance history can be used to predict the performance of the passthru method. For example, the stream manager 134 can measure the resources required by the operator graph 132 if passthru method 718 had a processing time of 5 ms but passthru method 722 had a processing time of 2 ms in previous runs.

The values for the predicted performance or resource usage for a particular passthru method can be compared to the threshold for the operator graph 132. If the predicted performance is greater than the threshold, then the method 700 may continue to operation 716 where a new passthru method can be selected. In various embodiments, if the passthru method was selected by the stream manager 134, the passthru method may be selected by the user.

If the predicted performance of the passthru method is less than the threshold, then the method 700 may continue to operation 726. Operation 726 may be optional, where the selected passthru method is associated with a default method. For example, if the stream manager 134 determines that the passthru method 722 meets the threshold and is selected by the user, then the stream manager 134 may associate passthru method 722 with the default passthru method whenever the passthru feature is enabled. After operation 726, the method 700 can proceed to operation 712 where the passthru method is selected for use by the stream manager 134.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

Aspects of the present disclosure may be embodied as a system, method, or computer program product. Accordingly, aspects of the present disclosure may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination thereof. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination thereof. In the context of this disclosure, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination thereof.

Computer program code for carrying out operations for aspects of the present disclosure may be written in any combination of one or more programming languages, including: (a) an object oriented programming language; (b) conventional procedural programming languages; and (c) a streams programming language, such as IBM Streams Processing Language (SPL). The program code may execute as specifically described herein. In addition, the program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure have been described with reference to flowchart illustrations, block diagrams, or both, of methods, apparatuses (systems), and computer program products according to embodiments of this disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions or acts specified in the flowchart or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

Although embodiments are described within the context of a stream computing application, this is not the only context relevant to the present disclosure. Instead, such a description is without limitation and is for illustrative purposes only. Additional embodiments may be configured to operate with any computer system or application capable of performing the functions described herein. For example, embodiments may be configured to operate in a clustered environment with a standard database processing application. A multi-nodal environment may operate in a manner that effectively processes a stream of tuples. For example, some embodiments may include a large database system, and a query of the database system may return results in a manner similar to a stream of data.

While the foregoing is directed to exemplary embodiments, other and further embodiments of the disclosure may be devised without departing from the basic scope thereof, and the scope thereof is determined by the claims that follow.

What is claimed is:

1. A computer program product for processing a stream of tuples, each tuple containing one or more attributes, the computer program product comprising a computer readable storage medium having program code embodied therewith, the program code comprising computer readable program code configured to:

process the attributes of the stream of tuples using stream operators operating on one or more computer processors and corresponding one or more processing elements;

detect an indicative element from a plurality of stream operators;

transmit, in response to detecting the indicative element, a passthru command to a processing element corresponding to the indicative element, wherein the transmit the passthru command includes:

determine a performance factor of the passthru command on the processing element, determine a threshold based on resources of a computing system, and select, in response to the performance factor falling within the threshold, the passthru command; and alter, in response to receiving the passthru command at the processing element, a portion of attribute processing for the indicative element.

2. The computer program product of claim 1, wherein the detect an indicative element includes:

determine an essential indicative element; and disable, in response to finding the essential indicative element, the plurality of stream operators.

3. The computer program product of claim 1, wherein the transmit a passthru command includes:

determine whether a passthru feature is enabled; and disable, in response to the passthru feature not being enabled, the plurality of stream operators.

4. The computer program product of claim 1, wherein select the passthru command includes:

select, in response to a presence of a default passthru method, the passthru command that corresponds to the default passthru method.

5. The computer program product of claim 1, wherein select the passthru command further includes:

associate a selected passthru command with a default passthru method.

6. The computer program product of claim 1, wherein the passthru command is selected from writing a reference attribute, passing the tuple through the stream operator, and forming a dummy stream operator.

7. A system for processing a stream of tuples, each tuple having one or more attributes, comprising:

one or more processing elements operating on one or more computer processors configured to processes the attributes from the stream of tuples;

a stream manager configured to alter a portion of attribute processing for an indicative element in response to the processing element receiving a passthru command, further comprising:

a stream operator monitor configured to detect the indicative element from a plurality of stream operators in the one or more processing elements;

a passthru manager configured to transmit the passthru command in response to detecting the indicative element, wherein the stream manager is configured to transmit a passthru command by:

determining a performance factor of the passthru command on the processing element;

determining a threshold based on resources of a computing system; and selecting, in response to the performance factor falling within the threshold, the passthru command.

8. The system of claim 7, the stream manager further comprising:

a selection interface configured to present to a user, in response to detecting the indicative element, a plurality of passthru methods that are associated with passthru commands for selection.

* * * * *